(12) United States Patent
Ookubo (10) Patent No.: US 6,949,157 B2
(45) Date of Patent: Sep. 27, 2005

(54) METHOD AND APPARATUS FOR MANUFACTURING PNEUMATIC TIRES

(75) Inventor: Yoshihiro Ookubo, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 320 days.

(21) Appl. No.: 10/279,839

(22) Filed: Oct. 25, 2002

(65) Prior Publication Data

US 2003/0111161 A1 Jun. 19, 2003

(30) Foreign Application Priority Data

Oct. 29, 2001 (JP) ........................................ 2001-330172

(51) Int. Cl.$^7$ .......................... B29D 30/38; B29D 30/10
(52) U.S. Cl. ...................................... 156/117; 156/397
(58) Field of Search ................................ 156/117, 397, 156/133, 440, 177, 181, 494, 495

(56) References Cited

U.S. PATENT DOCUMENTS

| | | | |
|---|---|---|---|
| 4,795,523 A | | 1/1989 | Laurent et al. |
| 5,039,372 A | * | 8/1991 | Deal ........................... 156/397 |
| 6,328,836 B1 | | 12/2001 | Ogawa |

FOREIGN PATENT DOCUMENTS

| | | |
|---|---|---|
| EP | 0 976 538 A2 | 2/2000 |
| JP | A 10-225998 | 8/1998 |

* cited by examiner

Primary Examiner—Geoffrey L. Knable
(74) Attorney, Agent, or Firm—Oliff & Berridge, PLC (57) ABSTRACT

A method and an apparatus for manufacturing a pneumatic tire, in which carcass plies are formed by applying carcass cords over an outer surface of a toroidal core along cord paths extending in a meridian direction of the core are disclosed. A zigzag shaped carcass cord arrangement is formed by applying a carcass cord on an outer surface of an imaginary column axially of the imaginary column and sequentially engaging the carcass cord around hook pins arranged at opposite axial end portions of the outer surface of the imaginary column. The core is moved toward the carcass cord arrangement so that a center axis and an equatorial plane of the core are matched with a center axis and an axial center plane of the imaginary column, respectively. The hook pins are moved radially toward the core so that an axial center portion of the carcass cord between the axially opposite hook pins are brought into contact with the outer surface of the core along its equatorial plane, and further moved radially from an outer peripheral side to an inner peripheral side of the core and also axially toward the core while maintaining tension of the carcass cords between the axial center portion situated at the equatorial plane of the core and the hooked portion engaged around the hook pins, so that the carcass cord is sequentially attached to the outer surface of the core from the outer peripheral side to the inner peripheral side of the core until the hooked portions of the carcass cord engaged around the hook pins are brought into contact with the outer surface of the core. Subsequently, the hooked portions of the carcass cord are pressed against the outer surface of the core for a given time so that the hooked portions of the carcass cord are attached to the core.

7 Claims, 7 Drawing Sheets

METHOD AND APPARATUS FOR MANUFACTURING PNEUMATIC TIRES

BACKGROUND OF THE INVENTION

1. Field of the Invention

The present invention relates to a method and apparatus for manufacturing a pneumatic tire wherein carcass plies are formed by applying carcass cord over an outer surface of a troidal core along cord paths extending in a meridian direction of the core, and particularly the carcass plies are formed on a flexible or high rigid core having an outer periphery shape corresponding to or resembling an inner periphery shape of a product tire.

2. Description of the Related Art

A conventional tire-manufacturing apparatus of this kind is disclosed, for example, in U.S. Pat. No. 6,328,836. The apparatus stretches carcass cords fed from a cord feed member in the meridian direction of a troidal core to apply the carcass cords over an outer surface of the core while indexing the core in the circumference direction. The apparatus is provided with a pivot feeding mechanism reciprocally displacing the cord feed member provided at a tip of an arm which can be, for example, a rotating arm or a pivoting arm along the outer peripheral surface of the core in the core meridian direction; pins allowing the carcass cord to engaging around the pins in an advancing position and supporting the carcass cord at folded portions of the reciprocal displacements of the cord feed members; and a press mechanism having press sections for pressing hooked portions or the folded portions of the carcass cords against the core by an advancing displacement toward the pins, swinging with the indexing action of the core in the indexing direction, and, after the pins being detached from the core, returning to the original position at which the press mechanism had been placed prior to swinging.

Such a conventional apparatus sequentially applies the carcass cords on an inner liner layer attached on the core provide by reciprocally displacing the cord feed member along the outer surface of the core in the meridian direction of the core to feed the carcass cord back and forth. The displacement of the cord feed member along the core meridian line, however, forces a longer cycle time, thereby resulting in a lower overall productivity of the apparatus, and needs complicated mechanisms. Therefore, it is highly desirable to realize a simple mechanism capable of reciprocating the cord feed member in a short time.

Moreover, the carcass cord is sequentially arranged along the core meridian line while the core is indexed in the circumference direction, so that stop time and start-up time of the core associated with the indexing action are needed, thereby resulting in a longer cycle time of the overall apparatus. It has also been demanded to realize a method and an apparatus which can reduce or eliminate the indexing action.

Further, the folded portion of the carcass cord is pressed against the core by a single press section of the press mechanism. The cord feed member for feeding the carcass cord moves from a folding at one terminal end portion in the meridian direction to the other terminal end portion in the meridian direction. However, a considerably longer time is required to push the folded portion into the inner liner and attach the folded portion to the inner liner with a sufficient is bonding strength. The pressing step is conducted at each folded portion of the cord feed member, resulting an extremely low operation efficiency of the carcass cord attachment.

DISCLOSURE OF THE INVENTION

The present invention is directed to solve the above problems, and it is an object of the present invention to provide a method and an apparatus for manufacturing a pneumatic tire which can reduce a product cycle time while securing a sufficient time for pressing the folded portion against the core.

The present invention has been completed to achieve the above-mentioned object, and its gist, constitution and operation will be described below.

According to one aspect of the present invention, there is provided a method for manufacturing a pneumatic tire, wherein carcass plies are formed by applying carcass cords over an outer surface of a toroidal core along cord paths extending in a meridian direction of the core, comprising the steps of:

forming a zigzag shaped carcass cord arrangement by applying a carcass cord on an outer surface of an imaginary column axially of the imaginary column and sequentially engaging the carcass cord around hook pins arranged at opposite axial end portions of the outer surface of the imaginary column, said imaginary column having a substantially sector-shaped cross section and a length equal to that of a cord path on the core;

moving the core toward said carcass cord arrangement so that a center axis and an equatorial plane of the core are matched with a center axis and an axial center plane of said imaginary column, respectively;

moving the hook pins radially toward the core so that an axial center portion of the carcass cord between the axially opposite hook pins are brought into contact with the outer surface of the core along its equatorial plane;

further moving the hook pins radially from an outer peripheral side to an inner peripheral side of the core and also axially toward the core while maintaining tension of the carcass cords between the axial center portion situated at the equatorial plane of the core and the hooked portion engaged around the hook pins, so that the carcass cord is sequentially attached to the outer surface of the core from the outer peripheral side to the inner peripheral side of the core until the hooked portions of the carcass cord engaged around the hook pins are brought into contact with the outer surface of the core; and subsequently pressing the hooked portions of the carcass cord against the outer surface of the core for a given time so that the hooked portions of the carcass cord are attached to the core.

In order to move the core into the carcass cord arrangement in a positive and effective manner, it is preferred that the substantially sector-shaped cross section of the imaginary column has a center angle of not larger than 180 degrees, and more preferably exactly 180 degrees.

The above-mentioned method for manufacturing a pneumatic tire according to one aspect of the present invention applies a carcass cord on the outer surface of the imaginary column to form the zigzag shaped carcass cord arrangement prior to attaching it on the core, so that the core does not need to be indexed, nor complicated paths do not need to be formed one after another along the core meridian. Further, even when the hooked portions of the carcass cord are pressed against the inner liner layer fox sufficient time to prevent it from peeling off the inner liner layer, the press step can be press a number of hooked portions, for example, corresponding to a half circle at the same time. Therefore, the method according to the present invention can extensively reduce a time necessary for attaching the carcass plies on the core.

According to another aspect of the present invention, there is provided an apparatus for manufacturing a pneumatic tire, wherein carcass plies are formed by applying carcass cords over an outer surface of a toroidal core along cord paths extending in a meridian direction of the core, the apparatus comprising:

hook pins arranged on an outer surface of an imaginary column at opposite axial end portions thereof, said imaginary column having a substantially sector-shaped cross section and a length equal to that of a cord path on the core, carcass cord applicator means for forming a zigzag shaped carcass cord arrangement by applying a carcass cord on the outer surface of the imaginary column axially of the imaginary column and sequentially engaging the carcass cord around the axially opposite hook pins;

first moving means for moving the core toward said carcass cord arrangement so that a center axis and an equatorial plane of the core are matched with a center axis and an axial center plane of said imaginary column, respectively;

second moving means for moving the hook pins radially toward the core so that an axial center portion of the carcass cord between the opposite hook pins are brought into contact with the outer surface of the core along its equatorial plane, and for further moving the hook pins radially from an outer peripheral side to an inner peripheral side of the core and also axially toward the core while maintaining tension of the carcass cords between the axial center portion situated at the equatorial plane of the core and the hooked portion engaged around the hook pins, so that the carcass cord is sequentially attached to the outer surface of the core from the outer peripheral side to the inner peripheral side of the core until the hooked portions of the carcass cord engaged around the hook pins are brought into contact with the outer surface of the core; and press means for pressing the hooked portions of the carcass cord against the outer surface of the core for a given time so that the hooked portions of the carcass cord are attached to the core.

In this instance, the hook pins and the carcass cord applicator means preliminary forms a zigzag shaped carcass cord arrangement, for example, corresponding to a half circle on the imaginary column, and the first and second moving means are cooperatively operated to apply the formed carcass cord arrangement on the core, so that larger carcass cord arrangement can be attached in shorter time.

Further, the press means for pressing the booked portions or the folded portions of the carcass cord against the outer surface of the core serves to press the folded portions into the inner liner layer for a sufficient time to bond them with the inner liner layer on the core, so that undesirable peeling or separation of the folded portions can be prevented. Moreover, since the press means can cooperatively press the hooked portions, for example, corresponding to a half circle at the same time, a sufficiently long press time can be secured for each of the hooked portions of the carcass cord while a total press time for pressing the entire hooked portions can be extensively reduced.

Preferably, the book pins are retractably provided. In the press means forming press hooks, and the second moving means comprises primary link elements having tip ends for supporting the press hooks on an axially same side of the imaginary column, and a primary base member on each axial side of the imaginary column. The primary base member is axially movable and pivotably connected to base ends of the primary link elements such that the base ends of the primary link elements are concentrically arranged around the center axis of the imaginary column.

In the apparatus, the hook pins are retractably provided in the press means, so that the press hooks having a hooking means and a press means together can be compactly configured. In addition, both the hook pins and the press means can be indexed and displaced by a single mechanism. Since the apparatus moves the press hooks by means of the primary link elements, the second moving means for moving the hook pins can be readily configured.

Preferably, the apparatus further comprises secondary link elements and a secondary base member. On each axial side of the imaginary column. The secondary link members have one ends pivotally connected to the primary link member at locations between the tip ends and the base ends, and the base ends are pivotally connected to the secondary base member such that the base ends of the secondary link elements are concentrically arranged around the center axis of the imaginary column. The primary and secondary base members are axially movable toward and away from each other.

The apparatus oscillates the primary link elements via the secondary link elements by displacing the secondary base member on the axis line like a movement of ribs of an umbrella, so that the apparatus can be simply configured in this case also.

Preferably, the apparatus further comprising a cord feed member reciprocally movable along a linear trajectory for feeding the carcass cord, and indexing means for sequentially indexing the primary base members so that the press hooks are successively positioned at turning portions of the reciprocal movement of the cord passage member.

In this case, the cord feed member is moved not troidally along the outer surface of the core, but linearly on the outer surface of the imaginary column, so that the carcass cord can be hooked around the hook pins in shorter time, and the first and the second moving means can be simplified.

When the substantially sector-shaped cross section of the imaginary column has a center angle of larger than 180 degrees, it is difficult to move the core into the carcass cord arrangement, so that the center angle is preferably not larger than 180 degrees, and most preferably 180 degrees.

Since the entire core is covered with a plurality of carcass cord arrangements, for example, two for the center angel of 180 degrees, three for the center angle of 120 degrees, four for the center angle of 90 degrees and so on, the number of steps to form the carcass plies can be reduced, resulting in shorter cycle time of the apparatus. Further, the central angle of each carcass cord arrangement is not limited to be the same, but a combination of different angles such as 180, 120 and 60 degrees can be used.

BRIEF DESCRIPTION OF THE DRAWINGS

For a better understanding of the invention, reference is made to the accompanying drawings, wherein.

DETAILED DESCRIPTION OF THE PREFERRED EMBODIMENT

Hereinafter, embodiments of the present invention will be described with reference to FIGS. 1 to 8.

Figure 1:
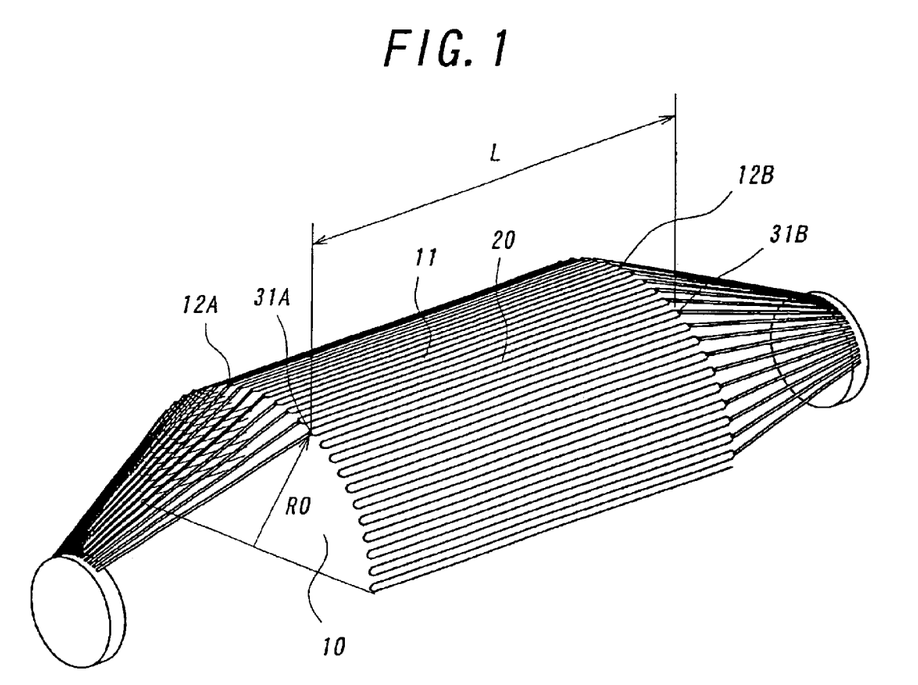
FIG. 1 is a perspective view of the zigzag shaped carcass cord arrangement showing in a state where it has been prepared.

FIG. 1 is a perspective view of a zigzag shaped carcass cord arrangement 20 showing in a state where it has been prepared. In FIG. 1, the carcass cord arrangement 20 is stretched over the axial direction of an outer surface 11 of an imaginary column 10 having a substantially sector-shaped cross section, and a plurality of hook pins 31A, 31B are arranged at opposite axial end portions 12A, 12B of the outer surface 11. The carcass cord arrangement 20 is engaged alternately around the hook pins 31A, 31B to make a zigzag shape.

The imaginary column 10 has a length L that is set to be the same as that of the carcass cord path of the carcass cord extending along a core meridian from one terminal end to the other terminal end of the core. It is noted that, although the imaginary column 10 in FIG. 1 has a half-circle cross section with a radius R0 or a sector-shaped cross section with a central angle of 180 degrees, the central angle is not limited to 180 degrees.

Figure 2:
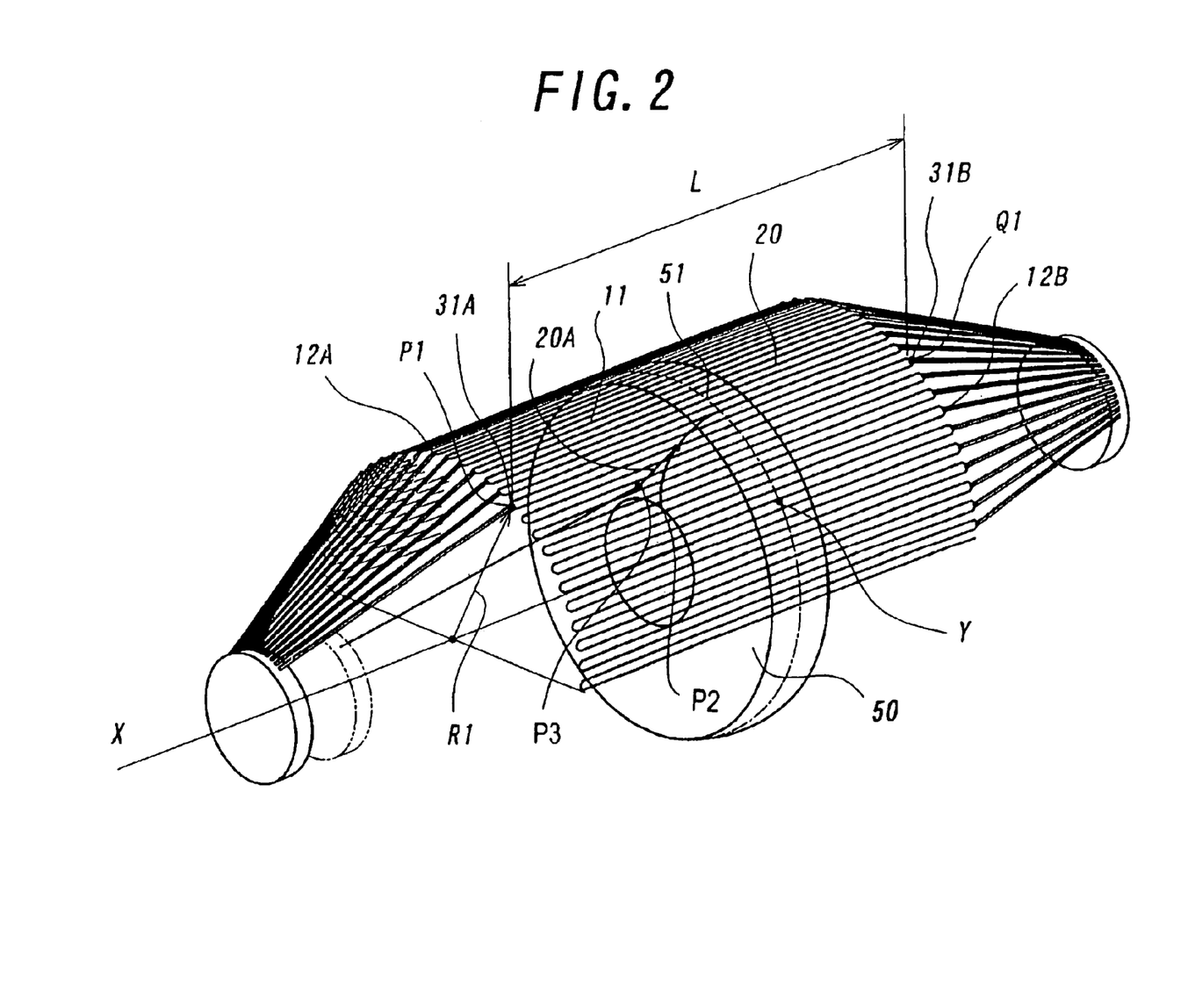
FIG. 2 is a perspective view of the zigzag shaped carcass cord arrangement showing in a state where it has been closely approached to the core.

FIG. 2 is a perspective view of the zigzag shaped carcass cord arrangement 20 showing in a state where it has been closely approached to the core. In FIG. 2, the core 50 moves toward the zigzag shaped carcass cord arrangement 20 prepared on the outer surface 11 of the semi-cylindrical column from a side where the semi-cylindrical column is opened. In this case, an axial center of the semi-cylindrical column is set to match with an axial center of the core on a line X as well as an equatorial plane of the semi-cylindrical column with an equatorial plane of the core on a plane Y. It is noted that an inner liner layer which is to be a inner layer of a carcass ply when a tire is assembled has been already attached on the approaching core 50.

Then the imaginary semi-cylindrical column is contracted from the radius R0 to R1, while maintaining a tension of the carcass cord arrangement 20 between the axially opposite hook pins 31A and 31B. That is, the hook pins 31A and 31B are simultaneously moved radially toward points P1 and Q1 of the core 50, respectively, so that an axial center portion of the carcass cord arrangement 20 are brought into contact with the outer surface of the core along its equatorial plane 51.

Thereafter, the hook pins 31A and 31B are further moved radially from an outer peripheral side to an inner peripheral side of the core 50 and also axially toward the core 50 while maintaining tension of the carcass cord between the axial center portion situated at the equatorial plane 51 of the core 50 and the hook portions engaged around the hook pins 31A and 31B. That is, the hook pin 31A is moved from P1, via P2, to P3 at which the hooked portion of the carcass cord is to be contact the core, so that the carcass cord is sequentially attached to the outer surface of the core from the outer peripheral side to the inner peripheral side of the core.

Figure 3:
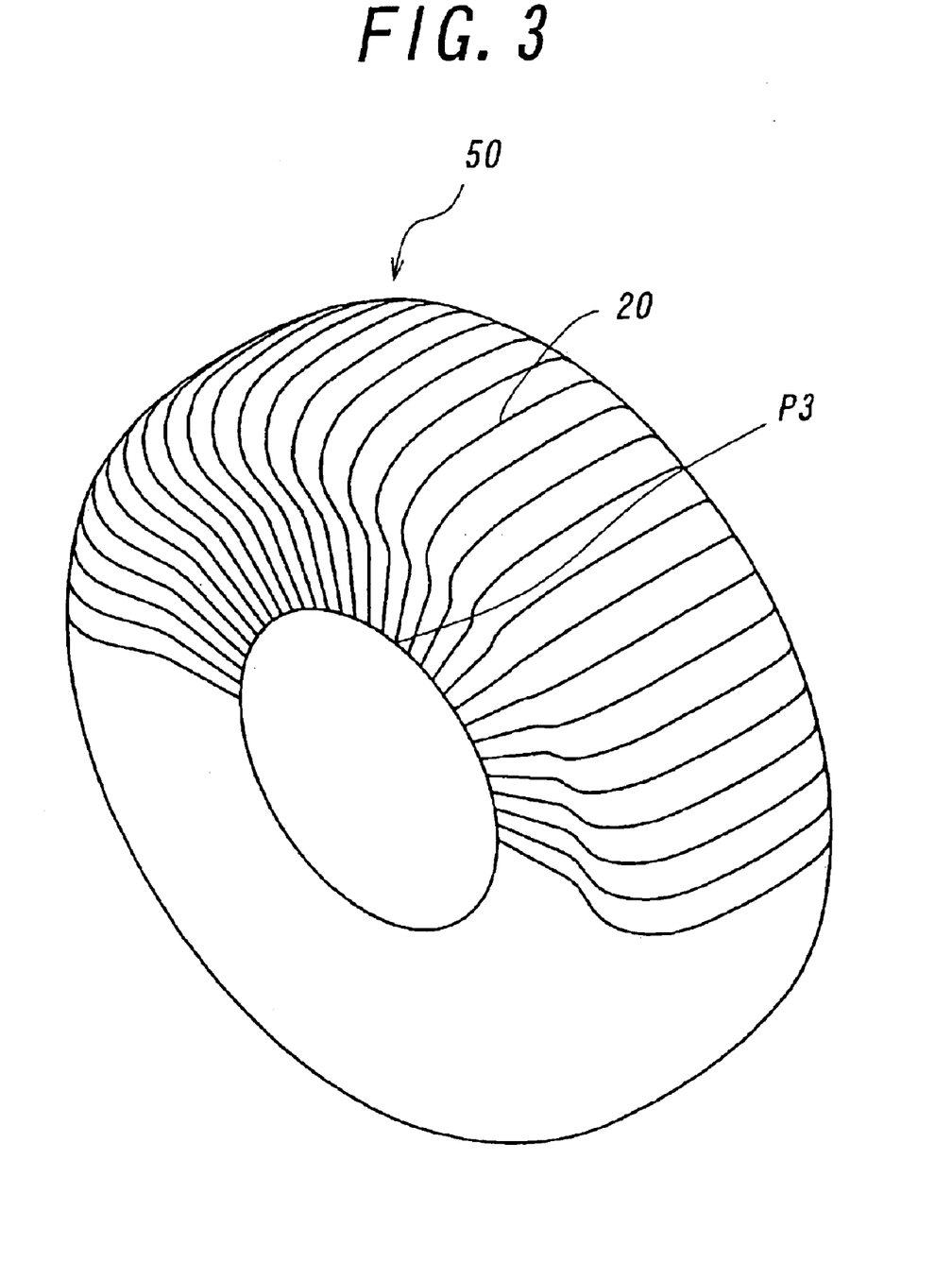
FIG. 3 is a perspective view of the zigzag shaped carcass cord arrangement showing in a state where it has been attached on the core.

FIG. 3 is a perspective view showing a core on which the carcass cord arrangement 20 has been applied. Subsequently to the step shown in FIG. 2, the hooked portions of the carcass cord engaged around the hook pins are brought into contact with the point P3 on the core 50, and are pressed with a sufficient time and pressure for preventing it from peeling off the subjacent inner liner layer. Thereafter, the hook pins are moved backwardly to form a carcass ply having the same center angle as the imaginary column on the core. This procedure is repeated until the entire core is covered with the carcass ply. That is, this procedure is repeated twice for the center angel of 180 degrees, three times for the center angle of 120 degrees, four times for the center angle of 90 degrees and so on. Further, the central angle of each procedure is not limited to be the same, but a combination of different angles such as 180, 120 and 60 degrees can be used.

Figure 4:
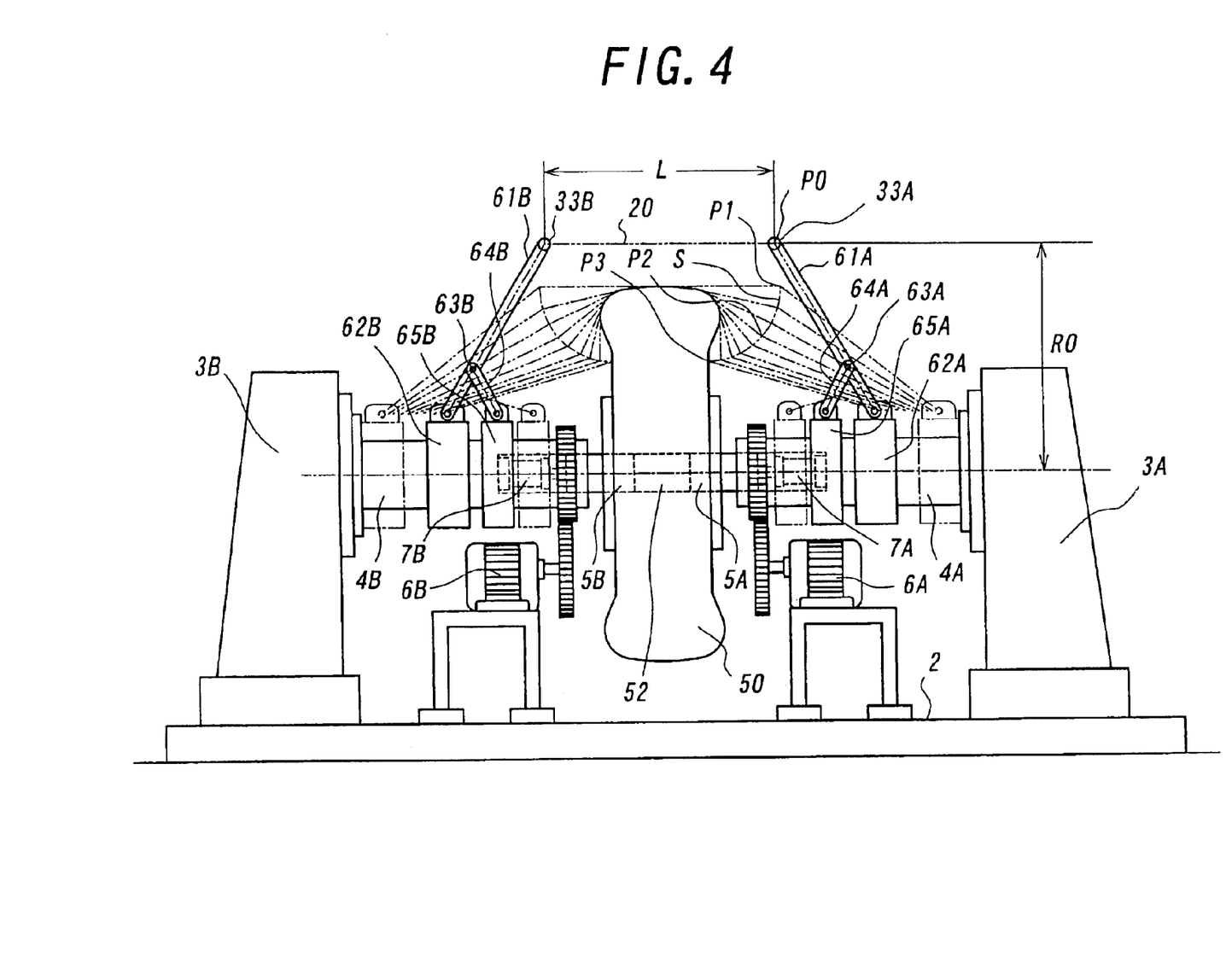
FIG. 4 is a plane view showing the apparatus for manufacturing a pneumatic tire according to the present invention.

FIG. 4 is a cross sectional view showing an apparatus 1 for manufacturing a pneumatic tire according to the present invention. The apparatus 1 is provided with head stock sections 3A, 3B on a common base 2, and guide axes 4A, 4B are disposed at the head stock sections 3A and 3B to be able to rotate around their axis lines.

The guide axes 4A, 4B are indexed around the axis lines via gears by indexing mechanisms 6A, 6B, and are provided with core attaching sections 5A, 5B for engaging with a core 50 to fixedly holding the core 50. The core attaching sections 5A, 5B can be moved back and forth along the guide axes by direct driven cylinders 7A, 7B built in the guide axes 4A, 4B.

Meanwhile, the apparatus 1 has press hooks 33A, 33B closely arranged on circumferences of each of half circles spaced each other in an axis line direction by a distance L with points on the axis lines of the right and left guide axes as their respective center. The press hooks 33A, 33B on each of the half circles are supported by tip ends of primary link elements 61A, 61B, respectively.

Base ends of the radially arranged primary link elements 61A, 61B are pivotably connected to primary base members 62A, 62B, tip ends 63A, 63B of secondary link elements 64A, 64B are pivotably connected to the primary link elements 61A, 61B at locations between the tip ends and the base ends of the primary link elements, and base ends of the radially arranged secondary link elements 64A, 64B are pivotably connected to secondary base members 65A, 65B.

The primary base members 62A, 62B and the secondary base members 65A, 65B can be displaced from side to side in parallel with but independently each other by driving means (not shown).

FIG. 4 shows the apparatus 1 in a state where the radiuses of the half circles on which the press hooks 33A, 33B are arranged are set to a maximum radius R0, and, therefore, a zigzag shaped carcass cord arrangement 20 hooked around hook pins provided on the respective press hooks 33A, 33B are tensionally placed on an outer surface of a semi-cylindrical column having a length L.

A below-mentioned carcass cord applicator means which is not shown in FIG. 4 is disposed outside the above-mentioned half circle of radius R0.

An inner liner layer has been already attached on an outer surface of the core 50 as shown in FIG. 4, and the core 50 is mounted in the apparatus 1 so that a center axis and an equatorial plane of the core are matched with a center axis and an axial center plane of the imaginary column. The core 50 also has an attaching hole 52 at its center into which each of core-attaching sections 5A, 5b of the apparatus 1 is inserted from axially each side so as to mount the core 50 in the apparatus 1 according to the following procedures.

That is, the core-attaching section 5A, 5B at the tips of the respective right and left guide axes 4A, 4B are moved from a state shown in FIG. 4 to a state where they have been axially displaced in parallel with each other in a direction apart from the axial center so as to be stood by. Thereafter, the core 50 is inserted between the core-attaching sections 5A and 5B, and then the core-attaching sections 5A, 5B are returned to the original positions to hold and lock the core 50.

The apparatus 1 can be also operated in the procedure reverse to the above-described order so as to remove the core 50 from the apparatus 1.

Next, an operation of the apparatus 1 will be discussed. For the purpose of simplifying the description, the operation is described in a right side only since the apparatus is symmetrically operated in each side. Starting from a state shown in FIG. 4 by a solid line, the primary base member 62A and the secondary link element 65A are moved along the guide axis 4, and, via the secondary link element 64A and primary link element 61A, the press hooks disposed at the tip end of the primary link element 61A are moved from point P0 to point P1. In the meantime, the press hooks are moved while a tension of the carcass cord arrangement 20 stretched between the hook pins in each side is uniformly maintained, so that the length L of the carcass cord remain constant.

Consecutively, the press hook 33A are moved from P1 to P3 via P2 while the tension of the carcass cord arrangement 20 is uniformly maintained, so that the primary base member 62A and the secondary base member 65A are cooperatively displaced along the guide axis 4A in parallel with each other, as mentioned above. Since this cooperative operation needs to be conducted while the tension of the carcass cord is uniformly maintained, the press hook 33A is to be controlled to move along a trajectory S shown in FIG. 4.

When the press hook 33A reaches the point P3, a hooked portion of the carcass cord engaged around a hook pin built in the press hook 33A is unhooked, and the hooked portion is pressed against the outer surface of the core 50 for a given time by press means disposed in the press book 33A. This pressing action is effected by applying a force for cooperatively displacing the primary base member 62A and the secondary base member 65A along the guide axis 4A to the left side in parallel with each other.

After pressing for a given time, when the primary base member 62A and the secondary base member 65A are moved in the direction opposed to the above-mentioned direction with the hooked portion of the carcass cord arrangement 20 being left on the core, the press hook 33A can be returned to the original position as shown in FIG. 4 while the carcass cord arrangement 20 is left on the core. Then, the core 50 moved away from the apparatus 1 and a series of operations is completed.

Figure 5A:
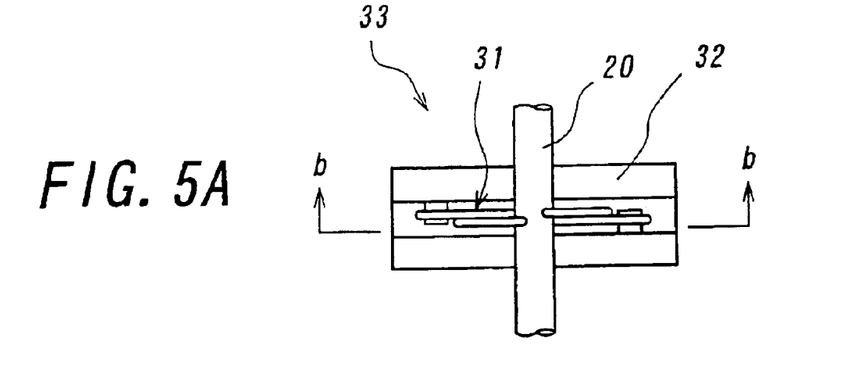
FIG. 5(a) is a top view showing the press means of the apparatus.
Figure 5B:
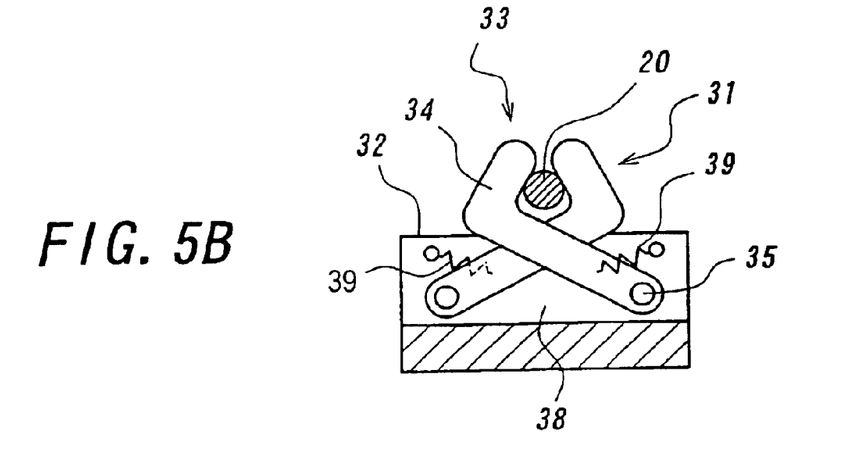
FIG. 5(b) is a cross sectional view showing the press means of the apparatus.
Figure 6:
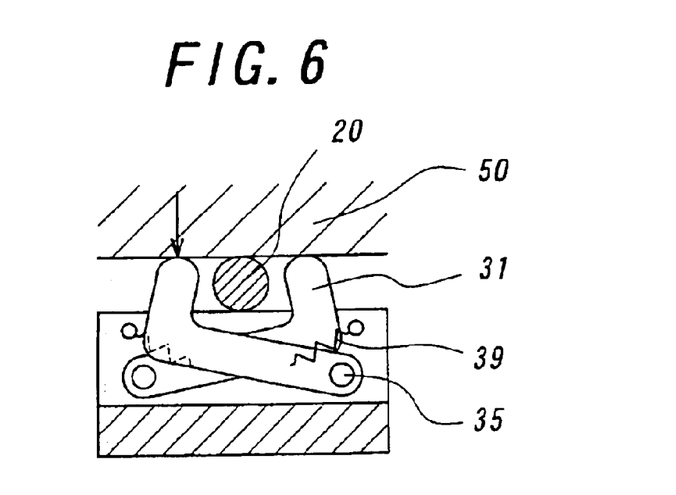
FIG. 6 is a cross sectional view showing the press means of the apparatus.

With reference to FIGS. 5 and 6, a detail of the press hook 33 will be described. FIG. 5(a) is a plane view of the press hook 33 showing in a state where the carcass cord 20 is engaged around it, and FIG. 5(b) is a sectional view of FIG. 5(a) taking along the line b—b. The press hook 33 has press means 32 and hook pin 31 consisting of a pair of hook 34 pivotably engaged around right and left pins 35 disposed on a flat face 38 in a groove of the central portion of the press means 32. The pair of hooks constituting the hook pin 31 are respectively coupled with the press means 32 via independently operating springs 39, and a force for independently moving each of the hooks 34 in a direction closing the press hook is applied by the spring action.

FIG. 6 is a cross sectional view of the press hook 33 corresponding to FIG. 5(b), showing in a state where the hook pin 31 is opened. In FIG. 6, the hook 34 can be pushed open against a tensile force of the spring 39 by, for example, contacting and pressing the tip of the hook 34 against the core 50. When the hook 34 is opened, the carcass cord arrangement 20 can be pressed against the core 50 by the press means 32.

Figure 7:
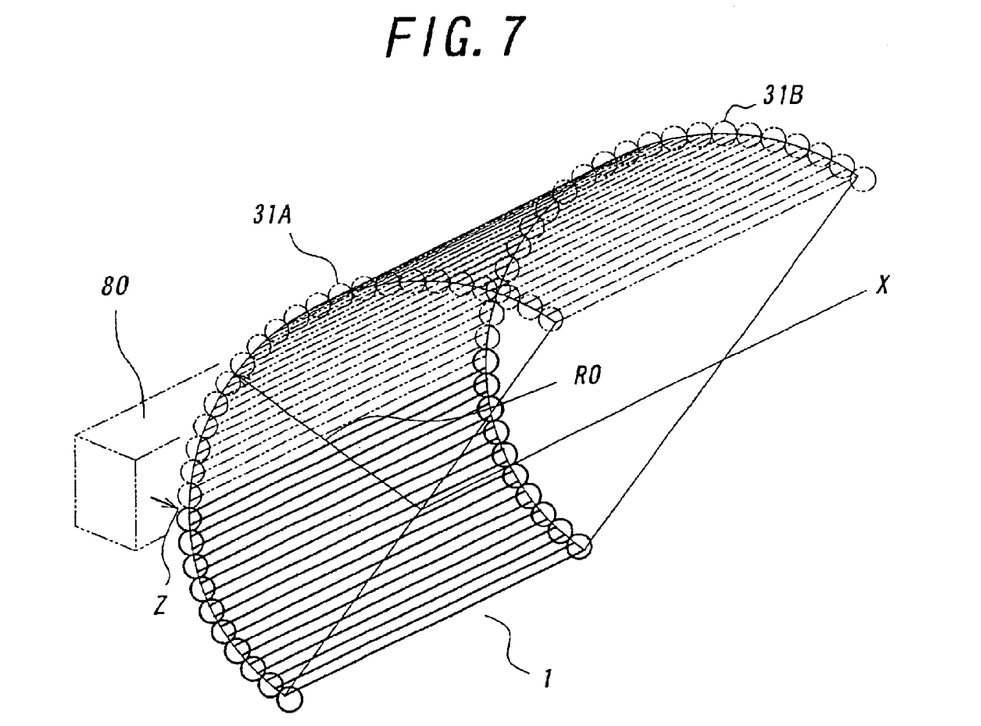
FIG. 7 is a perspective view showing an arrangement of carcass cord applicator means.
Figure 8:
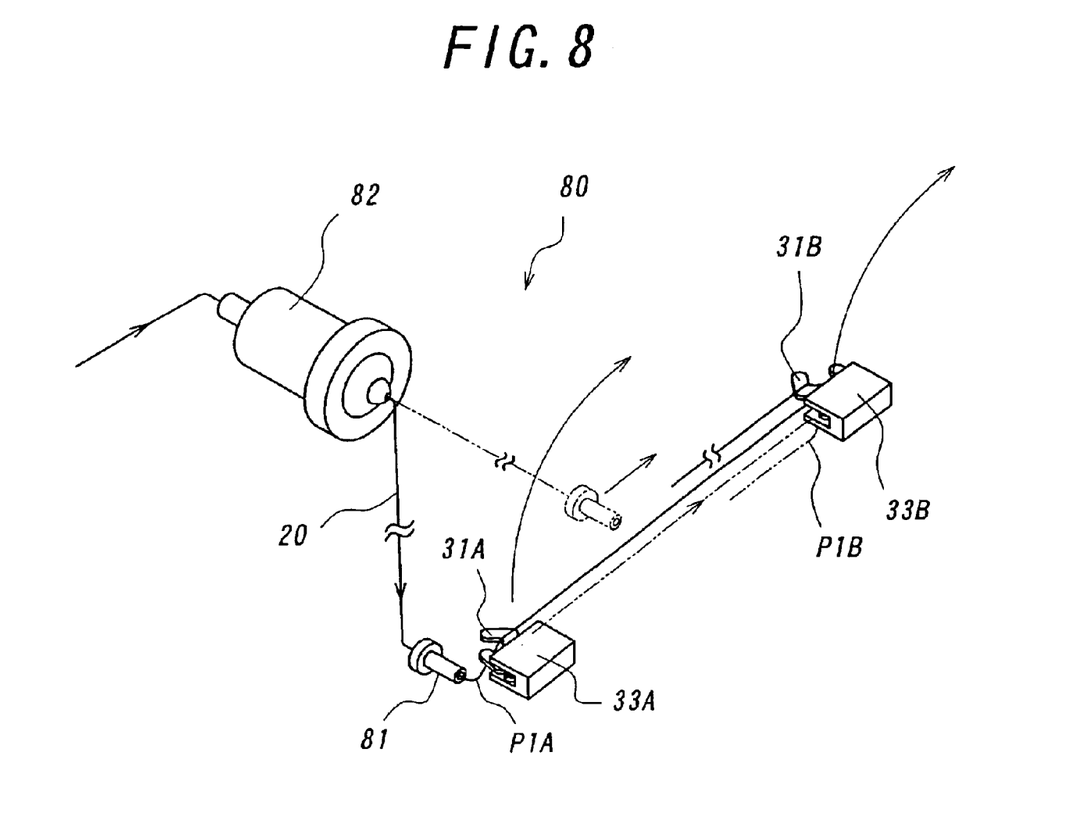
FIG. 8 is a perspective view showing the carcass cord applicator means.

With reference to FIGS. 7–8, a carcass cord applicator means 80 which engages the carcass cord arrangement 20 around the hook pin 32 of the press hook 33 will be described. FIG. 7 is a perspective view showing an arrangement of the carcass cord applicator means 80. As shown in FIG. 7, the carcass cord applicator means 80 is provided at position Z on the left side of the apparatus 1 in such a manner that the carcass cord applicator means nearly contacts a half circle of radius R0 on which the hook pins 31A, 31B are arranged. When the carcass cord arrangement 20 is engaged around the hook pins 31A, 31B, the hook pins 31A, 31B are indexed around the axis line of the apparatus 1 and the carcass cord arrangement 20 is sequentially engaged around the hook pins.

FIG. 8 is a perspective view showing the carcass cord applicator means 80. The carcass cord applicator means 80 is provided with a cord supplying feeder 82 fixedly disposed on the carcass cord applicator means 80 and a reciprocally displacing cord feed member 81 for feeding the carcass cord arrangement 20 from the cord supplying feeder 82 to engage the carcass cord around the hook pins 31A, 31B on each side.

The cross arranged hook pins 31A, 31B are indexed in a direction perpendicular to a orbital of the reciprocal displacement of the cord feed member 81 and are alternatively reached hooking points P1A, P1B corresponding to each turning point of the reciprocal displacement of the cord feed member 81. By repeating this operation, an zigzag shaped carcass cord arrangement 20 can be formed between the hook pins 31A, 31B.

The hook pins 31A, 31B at the position Z shown in FIG. 8 can be in a state where the book 34 is accommodated in a groove of the press means 32 as shown in FIG. 6 by pressing only the outer hook shown in FIG. 8 out of the two hooks 34 disposed in the press hook 33 shown in FIG. 5 with a press bar (not shown), and the carcass cord arrangement 20 shown in FIG. 8 can be hooked around inner hooks of the press hook 31A, 31B without interfering with the outer hook.

As having been clearly shown in the above description, according to the present invention, the zigzag shaped carcass cord arrangement is prepared on the outer surface of the imaginary column in advance, so that it is not necessary to index the core, nor to form complicated paths along the core meridian line one by one, thereby reducing a time to attach the carcass cord on the core. In addition, a plurality of hooked portions of the carcass cord can be simultaneously pressed, so that a sufficient press time for preventing it from peeling of the inner liner layer can be secured, and yet the time to attach the carcass cord on the core can be further reduced.

While the preferred embodiments of the present invention have been described, it is to be understood that modifications and variations may be made without departing from the scope of the invention as defined by the appended claims.

What is claimed is:

1. A method for manufacturing a pneumatic tire, wherein carcass plies are formed by applying carcass cords over an outer surface of a toroidal core along cord paths extending in a meridian direction of the core, said method comprising the steps of:

forming a zigzag shaped carcass cord arrangement by applying a carcass cord on an outer surface of an imaginary column axially of the imaginary column and sequentially engaging the carcass cord around hook pins arranged at opposite axial end portions of the outer surface of the imaginary column, the imaginary column having a substantially sector-shaped cross section and a length equal to that of a cord path on the core;

moving the core toward said carcass cord arrangement so that a center axis and an equatorial plane of the core are matched with a center axis and an axial center plane of said imaginary column, respectively;

moving the hook pins radially toward the core so that an axial center portion of the carcass cord between the axially opposite hook pins are brought into contact with the outer surface of the core along its equatorial plane;

further moving the hook pins radially from an outer peripheral side to an inner peripheral side of the core and also axially toward the core while maintaining tension of the carcass cords between the axial center portion situated at the equatorial plane of the core and the hooked portion engaged around the hook pins, so that the carcass cord is sequentially attached to the outer surface of the core from the outer peripheral side to the inner peripheral side of the core until the hooked portions of the carcass cord engaged around the hook pins are brought into contact with the outer surface of the core;

pressing the hook pins against the core, so that the hook pins open; and subsequently pressing the booked portions of the carcass cord against the outer surface of the core for a given time so that the hooked portions of the carcass cord are attached to the core.

2. The method according to claim 1, wherein said substantially sector-shaped cross section of the imaginary column has a center angle of not larger than 180 degrees.

3. An apparatus for manufacturing a pneumatic tire, wherein carcass plies are formed by applying carcass cords over an outer surface of a toroidal core along cord paths extending in a meridian direction of the core, said apparatus comprising:

press hooks having press means and hook pins, each one of the hook pins having a pair of hooks pivotally engaged and coupled to the press means;

the hook pins arranged on an outer surface of an imaginary column at opposite axial end portions thereof, said imaginary column having a substantially sector-shaped cross section and a length equal to that of a cord path on the core, carcass cord applicator means for forming a zigzag shaped carcass cord arrangement by applying a carcass cord on the outer surface of the imaginary column axially of the imaginary column and sequentially engaging the carcass cord around the axially opposite hook pins;

first moving means for moving the core toward said carcass cord arrangement so that a center axis and an equatorial plane of the core are matched with a center axis and an axial center plane of said imaginary column, respectively;

second moving means for moving the hook pins radially toward the core so that an axial center portion of the carcass cord between the opposite hook pins are brought into contact with the outer surface of the core along its equatorial plane, and for further moving the hook pins radially from an outer peripheral side to an inner peripheral side of the core and also axially toward the core while maintaining tension of the carcass cords between the axial center portion situated at the equatorial plane of the core and the hooked portion engaged around the hook pins, so that the carcass cord is sequentially attached to the outer surface of the core from the outer peripheral side to the inner peripheral side of the core until the hooked portions of the carcass cord engaged around the hook pins are brought into contact with the outer surface of the core, wherein the hook pins are pressed against the core, so that the pair of hooks open; and the press means presses the hook portions of the carcass cord against the outer surface of the core for a given time so that the hooked portions of the carcass cord are attached to the core.

4. The apparatus according to claim 3, wherein said hook pins are retractably provided in said press means forming press hooks, and said second moving means comprises primary link elements having tip ends for supporting the press hooks on an axially same side of the imaginary column, and a primary base member on each axial side of the imaginary column, said primary base member being axially movable and pivotably connected to base ends of the primary link elements such that the base ends of the primary link elements are concentrically arranged around the center axis of the imaginary column.

5. The apparatus according to claim 4, further comprising secondary link elements and a secondary base member on each axial side of the imaginary column, each said secondary link element having one end pivotally connected to a primary link element at a location between said tip end and said base end, and the base ends are pivotally connected to the secondary base member such that the base ends of the secondary link elements are concentrically arranged around the center axis of the imaginary column, said primary and secondary base members being axially movable toward and away from each other.

6. The apparatus according to claim 4, further comprising a cord feed member reciprocally movable along a linear trajectory for feeding the carcass cord, and indexing means for sequentially indexing the primary base members so that the press hooks are successively positioned at turning portions of the reciprocal movement of the cord passage member.

7. The apparatus according to claim 3, wherein said substantially sector-shaped cross section of the imaginary column has a center angle of not larger than 180 degrees.

* * * * *